United States Patent
Bay et al.

(10) Patent No.: US 12,159,381 B2
(45) Date of Patent: Dec. 3, 2024

(54) ERROR-ROBUST CAPTURE OF VEHICLE SURROUNDINGS

(71) Applicant: Bayerische Motoren Werke Aktiengesellschaft, Munich (DE)

(72) Inventors: Erwin Bay, Munich (DE); Jonas Legl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 17/633,755

(22) PCT Filed: Jul. 31, 2020

(86) PCT No.: PCT/EP2020/071720
§ 371 (c)(1),
(2) Date: Feb. 8, 2022

(87) PCT Pub. No.: WO2021/028245
PCT Pub. Date: Feb. 18, 2021

(65) Prior Publication Data
US 2022/0327671 A1 Oct. 13, 2022

(30) Foreign Application Priority Data
Aug. 9, 2019 (DE) .................... 10 2019 121 502.1

(51) Int. Cl.
*G06V 10/00* (2022.01)
*B60R 1/12* (2006.01)
(Continued)

(52) U.S. Cl.
CPC .................. *G06T 5/80* (2024.01); *B60R 1/12* (2013.01); *B60W 60/001* (2020.02);
(Continued)

(58) Field of Classification Search
CPC ........ G06T 5/006; G06T 5/80; B60W 60/001; B60W 2420/403; B60W 2420/42;
(Continued)

(56) References Cited

U.S. PATENT DOCUMENTS

| | | | |
|---|---|---|---|
| 4,986,646 A | 1/1991 | Hamamoto et al. | |
| 5,111,401 A * | 5/1992 | Everett, Jr. .......... | G05D 1/0255 180/169 |

(Continued)

FOREIGN PATENT DOCUMENTS

| | | |
|---|---|---|
| CN | 101676148 A | 3/2010 |
| DE | 39 23 174 C2 | 8/1994 |

(Continued)

OTHER PUBLICATIONS

Kim et al., "KR101684551B1 BSD Mounting Angle Detection System of BSD Sensor and the Detection Method", KR20150091368A-2015-06-26; Publication.*

(Continued)

*Primary Examiner* — Amir Alavi
(74) *Attorney, Agent, or Firm* — Crowell & Moring LLP

(57) ABSTRACT

A method for the reliable and error-robust analysis of visually captured vehicle surroundings is provided. A deviation of a camera orientation caused by a force impacting an exterior mirror carrying the camera can be compensated fully automatically. As a result, the method can be used during active travels in the field and creates more safety, in particular for autonomous driving.

10 Claims, 1 Drawing Sheet

(51) Int. Cl.
  *B60W 60/00* (2020.01)
  *G01B 21/22* (2006.01)
  *G06T 5/80* (2024.01)

(52) U.S. Cl.
  CPC ...... *G01B 21/22* (2013.01); *B60R 2001/1253* (2013.01); *B60W 2420/403* (2013.01)

(58) Field of Classification Search
  CPC ..... B60R 1/00; B60R 1/12; B60R 2001/1253; B60R 2011/004; B60R 2300/30; B60R 2300/70; G01B 21/22
  See application file for complete search history.

(56) References Cited

U.S. PATENT DOCUMENTS

| | | | | |
|---|---|---|---|---|
| 9,606,539 | B1* | 3/2017 | Kentley | G01S 17/875 |
| 10,401,852 | B2* | 9/2019 | Levinson | G05D 1/0027 |
| 10,474,162 | B2* | 11/2019 | Browning | B60W 30/095 |
| 10,496,766 | B2* | 12/2019 | Levinson | B60W 60/00253 |
| 10,768,011 | B2* | 9/2020 | Sunil Kumar | G01C 21/30 |
| 10,983,530 | B2* | 4/2021 | Sarkar | G01S 17/86 |
| 11,668,842 | B2* | 6/2023 | Ewert | G01S 19/40 |
| | | | | 342/357.25 |
| 11,827,351 | B2* | 11/2023 | Karachalios | G05D 1/0094 |
| 11,886,189 | B2* | 1/2024 | Karachalios | G06T 7/0014 |
| 2004/0196368 | A1 | 10/2004 | Asai | |
| 2005/0206510 | A1 | 9/2005 | Weber et al. | |
| 2009/0179773 | A1 | 7/2009 | Denny et al. | |
| 2010/0066833 | A1 | 3/2010 | Ohshima et al. | |
| 2012/0123638 | A1 | 5/2012 | Bechtel et al. | |
| 2017/0327039 | A1 | 11/2017 | Kimura | |
| 2019/0317225 | A1* | 10/2019 | Ewert | G01S 19/40 |
| 2022/0327671 | A1* | 10/2022 | Bay | B60W 60/001 |

FOREIGN PATENT DOCUMENTS

| | | |
|---|---|---|
| DE | 195 19 619 A1 | 12/1996 |
| DE | 10 2004 050 181 A1 | 6/2005 |
| DE | 60 2004 000 387 T2 | 10/2006 |
| DE | 199 37 021 B4 | 2/2007 |
| DE | 10 2010 005 638 A1 | 7/2011 |
| WO | WO 01/10679 A1 | 2/2001 |

OTHER PUBLICATIONS

Chinese-language Office Action issued in Chinese Application No. 202080056197.4 dated Mar. 26, 2023 with English translation (11 pages).

International Search Report (PCT/ISA/210) issued in PCT Application No. PCT/EP2020/071720 dated Sep. 24, 2020 with English translation (six (6) pages).

German-language Written Opinion (PCT/ISA/237) issued in PCT Application No. PCT/EP2020/071720 dated Sep. 24, 2020 (six (6) pages).

German-language Search Report issued in German Application No. 10 2019 121 502.1 dated Mar. 17, 2020 with partial English translation (11 pages).

* cited by examiner

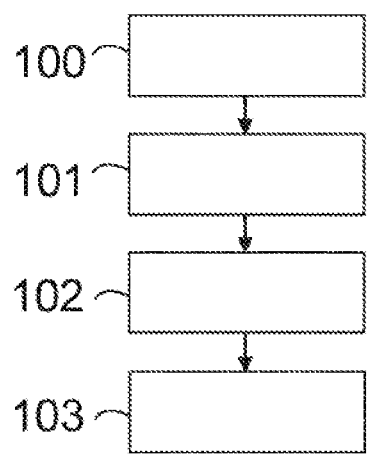

ERROR-ROBUST CAPTURE OF VEHICLE SURROUNDINGS

BACKGROUND AND SUMMARY OF THE INVENTION

The invention relates to a method for reliable and error-tolerant evaluation of a visually captured vehicle surround. According to an embodiment of the invention, it is possible for a deviation of a camera alignment on account of the action of a force on an outside mirror carrying the camera to be compensated for fully automatically. Consequently, the method according to an embodiment of the invention can be used even during active journeys in the field and develops a safety advantage, especially during autonomous driving. One aspect of the present invention relates to the folding in and out of the outside mirrors. As a consequence of the action of an external force and the adjustment, the mirror is returned back to its initial position according to one aspect of the present invention. Further, the present invention relates to a correspondingly configured system arrangement. Moreover, a computer program product with control commands is proposed, which implement the method or operate the proposed system arrangement.

DE 19 937 021 B4 discloses a mirror that is adjustable about at least two axes, comprising a sensor arrangement for detecting the mirror position.

DE 195 19 619 A1 exhibits an adjustment automatism for outside mirrors of vehicles. For adjustment purposes, the height and head height are detected, and, from this, the resultant vertical position of the vehicle driver eye region is calculated in order, in a manner adapted thereto, to continuously adjust the mirrors.

DE 39 23 174 C2 has disclosed an electrical rearview mirror apparatus for a motor vehicle. It comprises a housing and a mirror body which is mounted so as to be rotatable relative to the housing. Moreover, the rearview mirror apparatus has a device for detecting a relative position of the mirror body. In this case, rod-shaped permanent magnets are provided, the relative positions of which are detected by two Hall magnet sensors.

The prior art has disclosed arrangements which, for example, provide a rearview mirror of a motor vehicle, the latter being provided with devices that either can indicate a lane change or can output a warning signal. In the case of a direction indicator integrated in a rearview mirror, the direction indicator is a conventional lamp that is coupled to the vehicle electronics via a wired interface.

It is also known that on account of the action of a force on an outside mirror, the latter can be varied in terms of its position in such a way that an incorrect alignment arises. Outside mirrors can often be folded in and out, and each of these processes is potentially afflicted by errors in such a way that the alignment of the outside mirror deviates from a target position after each process. Moreover, a force may act on the outside mirror on account of an accident. Typical examples include contact between the outside mirror and a wall in a parking garage, or a collision between the outside mirror and a cyclist. Consequently, the desired position of the outside mirror is no longer present, and a deviation arises, the latter being corrected manually according to conventional methods.

Moreover, methods are known which drive the outside mirror and subsequently physically put the latter into the desired position. Complicated methods are required to this end, and these moreover depend on the motor system of the mirror still being intact. However, this is not always the case.

Moreover, camera systems which are installed in the outside mirror are known. Thus, an external camera can assist the driver and supply an image of a vehicle surround. Since the cameras are typically securely installed in the body of the outside mirror, the alignment of such a camera also varies with the position of the outside mirror.

Although the prior art generally identifies that there may be an undesirable variation in a mirror position, it only discloses inadequate options for correcting the mirror position. Typically, this is implemented by way of a physical readjustment, but this is technically complicated.

It is an object of the present invention to propose an improved method, in particular a more reliable method, for compensating errors within the scope of an image recognition, inter alia that of an automobile or a motorcycle. The image recognition should be able to be carried out without errors and reliably even in the case of a deviation of a camera alignment on account of the action of a force on, or on account of folding in and out of, an outside mirror that carries the camera. Further, it is an object of the present invention to provide an appropriately set up system arrangement and to propose a computer program product with control commands, which implement the method or at least operate the proposed system arrangement in part.

These objects are achieved by the claimed invention.

Accordingly, a system arrangement is proposed for reliable and error-tolerant evaluation of a visually captured vehicle surround, comprising a rearview mirror apparatus having at least one position sensor configured to measure a positional deviation from a preset position; an imaging sensor configured to capture the vehicle surround and a data interface configured to transfer the positional deviation and the captured vehicle surround to a control unit; and the control unit, which is configured to process the captured vehicle surround dependent on the positional deviation.

The proposed method or the system arrangement is efficient since it is no longer necessary to physically bring the rearview mirror into a suitable position, or the mirror head can continue to be returned into the initial position. The point is to recognize deviations, optionally to activate the drive and only to compensate inaccuracies in relation to the last valid position. In fact, according to an embodiment of the invention, the signal provided by the imaging sensor is processed. Consequently, the proposed method can therefore be carried out in such a way that only the incoming data need to be processed and the mirror as such need not be newly aligned. This is reliable therefore, in particular, since it is not always possible to ensure that the motor of the mirror is operational in the case of an accident, and consequently it is not always possible, in accordance with the prior art, to physically adapt the position of the mirror. Automated driving cannot be continued following such an accident. According to the invention, this disadvantage is overcome by virtue of the mirror being able to remain in its incorrect position and only the image of the camera having to be processed or adapted.

Consequently, the proposed method is also particularly error tolerant since even an ongoing operation is assisted, according to an embodiment of the invention, in such a way that should the mirror be adjusted during an ongoing journey, this is also taken into account in automated fashion during the journey, to the effect of the image of the installed camera being adapted. It is also possible to compensate only small adjustments which are caused by folding in/out. Consequently, it is possible according to an embodiment of the invention to compensate the incorrect position of the mirror and, implicitly, the incorrect position of the camera unit in real time. The mirror is often only adjusted minimally, leading to the driver receiving a sufficiently good image in the rearview mirror; however, the camera alignment is no longer usable for autonomous driving in particular. Thus, according to an embodiment of the invention, autonomous driving can still be supported, even if the outside mirror together with the installed camera is slightly adjusted.

The proposed invention especially considers the autonomous method, which provides for a plurality of imaging sensors. These sensors serve, inter alia, to recognize traffic signs, lane markings and other road users. Moreover, corresponding sensors are calibrated, meaning that the processing components expect exactly one certain image. If the camera is now varied in terms of its position, the varied image is distorted and can no longer be processed or, according to the prior art, it is nevertheless processed and consequently leads to incorrect results.

According to an embodiment of the invention, this is overcome in particular by virtue of the respective image being able to be adapted, and hence the calibration can be maintained. Typically, cameras are installed in both outside mirrors and the images of further sensors can no longer be overlaid if an alignment of one camera deviates. This is what an embodiment of the invention draws upon, and the incorrect image is corrected.

To this end, the position sensor recognizes that a faulty setting is present and, following this, it does not trigger a physical adjustment of the mirror per se; instead, this only leads to the image being corrected dependent on the faulty setting.

Such processing of the captured vehicle surround can be implemented in such a way that a table is stored, the latter specifying the correction parameter that needs to be added or multiplied for any given deviation of the outside mirror and hence of the camera alignment. The captured vehicle surround is consequently corrected virtually and, figuratively speaking, the generated image of the vehicle surround is pushed back into the correct position. How such a correction needs to be implemented can be ascertained empirically and stored in a vehicle memory. Consequently, it is possible at runtime to resort to appropriate correction parameters and apply these dynamically.

By way of example, an offset can be assigned to a specific angle of a deviation of the camera alignment, said offset needing to be added to the resultant image. Consequently, the angle of the camera alignment can be determined and the method according to an embodiment of the invention consequently knows the number of measurements the resultant image has to be subsequently virtually offset. Consequently, the desired image arises once again, and the further sensors need not be calibrated anew.

The incorrect position may be present both in the horizontal and vertical direction, and consequently the resultant image of the vehicle surround should precisely also be displaced vertically and/or horizontally. In general, it is also possible to determine a rotation on the basis of the vertical and horizontal misalignment, the rotation specifying how the image should be twisted so that the desired or expected image emerges. The proposed invention consequently provides for an error in the camera alignment to be identified and for this error to be applied inversely to the resultant image. Consequently, the original image arises again, without physical components needing to be physically realigned.

The current position of the outside mirror can be measured by way of the relative position sensor or the position sensor measuring the time taken for the outside mirror to move to its final position from an initial position. Proceeding from the acceleration of the mirror and the speed, the sensor can subsequently be used to measure how far the outside mirror has moved. If the time to the end position is measured, it may be possible to deduce not only an accurate position but also take account of other influences such as stress, temperature, wear, etc. Moreover, it is alternatively or additionally possible to calculate the angle through which the outside mirror was moved. By way of example, if an outside mirror is folded in, it is possible for the latter to need to be rotated through 90° from the initial position into the final position. This can be detected and consequently it is also possible to measure whether the mirror rotates through the full 90° or whether simply a smaller value is possible at best. This may be caused by the mirror having collided with an object in the direction of travel and consequently being pressed toward the vehicle in the direction of travel. Otherwise, it is possible for a force to act counter to the direction of travel, for example if the vehicle has been parked and a pedestrian collides with the mirror. Thereupon, it is also possible for the mirror to be rotated in the direction of travel and for an angle of greater than 90° now being required to bring the mirror into the folded-in position from its initial position. In this way, it is possible according to an embodiment of the invention to read or specify the position of the mirror. The sensor can monitor the current position. A folding in/out process may not be required to measure the angle.

The detected values may be correlated to values specifying how this altered position of the outside mirror affects the camera image. If the mirror is subsequently repaired again and adjusted in such a way that it can be brought into the desired position, it is possible according to an embodiment of the invention for this also to be detected by the position sensor, and so the system can be automatically recalibrated. Following the repair, a recalibration over a journey of several kilometers will be justifiable. In this case, the sensor detects the new position and can consequently report that the configuration as set at the factory is present again. This is recognized automatically, and the camera image is subsequently adapted accordingly. Optionally, there is no factory-based setting of the camera or the mirror.

Overall, there hence is a dynamic adjustment of the camera image since the position of the outside mirror can always be monitored, for example when starting the vehicle. Depending on this position, the camera image is also subsequently adapted, and a corresponding surround of the motor vehicle is captured correctly again.

The present invention offers the advantage that, inter alia, a corresponding camera system is maintenance-free and need not be manually recalibrated for each change of the outside mirror. Alternatively or in addition, the calibration is implemented automatically, but this requires several kilometers of journey. This is necessary, in particular, in the case of autonomous driving which recognizes a lane marking, inter alia, by way of the imaging sensor. Further, it is possible to also use the imaging sensor to recognize vehicles which wish to overtake the vehicle and overtaking maneuvers of other vehicles can be recognized. Consequently, according to an embodiment of the invention, the disadvantage that a conventional system must interrupt the autonomous control of the vehicle is overcome, and a reliable image representation of the surround is always supplied according to an embodiment of the invention.

The proposed method can also control the system controller in such a way that the method is carried out iteratively and consequently the position of the outside mirror, and hence the camera position, is always monitored and dynamically adapted at runtime. The position of mirror and camera is optionally not adapted physically. The software compensates the error measured by the sensor.

According to one aspect of the present invention, the control unit is configured to process the captured vehicle surround within the scope of autonomous driving. This is advantageous in that the advantages according to the invention really come into their own. In general, the resultant image of the vehicle surround can be displayed on a display, with autonomous driving in particular requiring a reliable data source. Hence, it is advantageous especially in this case to resort to a system which supplies reliable data of the vehicle surround at any time, that is to say also in real time.

According to a further aspect of the present invention, the control unit is configured to recognize and compensate an image shift in the captured vehicle surround dependent on the position deviation, for example a rotation, about the folding axis. This is advantageous in that the data of the vehicle surround can be processed in fully automated fashion in such a way that the desired image is always available. Consequently, errors resulting from the camera alignment deviation can be rectified in automated fashion and consequently safe autonomous driving can be ensured.

According to a further aspect of the present invention, a reproduction unit is provided, the latter outputting the captured vehicle surround in processed fashion. This is advantageous in that the driver can also be provided with the corrected information and hence they can have the corrected information displayed on a screen or have this information overlaid on the windshield.

According to a further aspect of the present invention, the position sensor is configured to recognize the positional deviation dependent on an alignment angle of the rearview mirror apparatus. This is advantageous in that the position of the rearview mirror is coupled to the position of the camera, and hence the effects a positional deviation of the rearview mirror has on the camera setting are known at all times. In general, according to one aspect of the present invention, it is possible to distinguish between the mirror head and mirror glass.

According to a further aspect of the present invention, the control unit is configured to recognize an image shift dependent on the positional deviation and correct the coordinates of the features detected in the vehicle surround. In addition to correcting the image (shift, rotation), it is also possible to correct the coordinates of the features (objects, pedestrians) determined in the image. From a technical point of view, the previous calibration of the camera was corrected, and hence the coordinates of the detected features.

According to a further aspect of the present invention, the preset position corresponds to a factory setting and/or a calibrated position. This is advantageous in that the vehicle needs to be calibrated only once in respect of the sensor system, for example upon delivery, and further calibrations are carried out automatically. Thus, the vehicle can be set at the factory and should deviations in respect of the camera position be present after being used, the vehicle corrects corresponding deviations in automated fashion. A new calibration is not required.

According to a further aspect of the present invention, the imaging sensor is integrated in a surround camera. This is advantageous in that even conventional camera systems can be reused according to an embodiment of the invention, and it is only the resultant image that needs to be adapted according to an embodiment of the invention. Consequently, it is possible to update the surround information with little technical outlay and it is correspondingly easily possible to retrofit existing vehicles.

According to a further aspect of the present invention, the data interface is present as a wired interface and/or as an air interface. This is advantageous in that either the data can be transferred by way of physical contact, i.e., a line, or else a radio connection is established between the electronics of the outside mirror and the control unit. Furthermore, it is possible to use both transmission techniques simultaneously, or to prioritize these. Thus, the transmission can preferably be implemented by wires and, should a wired transmission not be available, a wireless transmission can be ensured. This refers in particular to the use scenario where an accident has twisted the outside mirror and it is consequently possible for even a wired line to be interrupted. Thereupon, a wireless connection is available according to an embodiment of the invention.

The object is also achieved by a method for reliable and error-tolerant evaluation of a visually captured vehicle surround, including a measurement of a positional deviation of a rearview mirror apparatus comprising at least one position sensor from a preset position; a capture of the vehicle surround by way of an imaging sensor integrated in the rearview mirror apparatus; a transmission of the positional deviation and the captured vehicle surround to a control unit; and a processing of the captured vehicle surround by the control unit dependent on the positional deviation.

The object is also achieved by a computer program product having control commands which carry out the method and operate the proposed arrangement when executed on a computer.

According to an embodiment of the invention, it is particularly advantageous for the method to be able to be used to operate the proposed apparatuses and units, or the system arrangement. Further, the proposed apparatuses and devices are suitable for carrying out the method according to an embodiment of the invention. Consequently, the device in each case implements structural features suitable for carrying out the corresponding method. However, the structural features could also be designed as method steps. Additionally, the proposed method contains steps for implementing the function of the structural features.

Further advantages, features and details of the invention arise from the following description, which describes aspects of the invention in detail with reference to the drawings. In so doing, the features mentioned in the claims and in the description may be in each case essential to the invention, both on their own or in any combination. Likewise, the features specified above and the features explained in more detail here may find use either on their own or combined together in any combination. The shown and described embodiments should not be construed as restrictive but instead are of exemplary nature for the purposes of explaining the invention. The detailed description serves to inform a person skilled in the art, and so known circuits, structures and methods are not shown or explained in detail in the description in order not to impede the understanding of the present description.

BRIEF DESCRIPTION OF THE DRAWING

FIG. 1 shows a schematic flowchart of a method for reliable and error-tolerant evaluation of a visually captured vehicle surround according to one aspect of the present invention.

DETAILED DESCRIPTION OF THE DRAWING

In a schematic flowchart, FIG. 1 shows a method for reliable and error-tolerant evaluation of a visually captured vehicle surround, including a measurement 100 of a positional deviation of a rearview mirror apparatus comprising at least one position sensor from a preset position; a capture 101 of the vehicle surround by way of an imaging sensor integrated in the rearview mirror apparatus; a transmission 102 of the positional deviation and the captured vehicle surround to a control unit; and a processing 103 of the captured vehicle surround by the control unit dependent on the positional deviation.

Since the method steps are designed analogous to the functional properties of the corresponding structural features of the system arrangement, the diagram as per the present FIGURE can also be interpreted as a block diagram of the system arrangement, with each method step being assigned a corresponding component of the system arrangement.

In this context, a person skilled in the art recognizes that the steps may have further substeps and, in particular, that the method steps can each be carried out iteratively and/or in a different sequence.

What is claimed is:

1. A system arrangement for reliable and error-tolerant evaluation of a visually captured vehicle surround, the system arrangement comprising:
   a rearview mirror apparatus having at least one position sensor configured to measure a positional deviation of the rearview mirror apparatus from a preset position;
   an imaging sensor integrated in the rearview mirror apparatus and configured to capture an image of the vehicle surround;
   a data interface configured to transfer the positional deviation and the captured image of the vehicle surround to a control unit; and
   the control unit, which is configured to correct the captured image of the vehicle surround dependent on the positional deviation.

2. The system arrangement according to claim 1, wherein the control unit is further configured to correct the captured image of the vehicle surround within the scope of autonomous driving.

3. The system arrangement according to claim 1, wherein the control unit is further configured to recognize an image shift dependent on the positional deviation and to compensate the captured image of the vehicle surround accordingly.

4. The system arrangement according to claim 1, wherein the control unit is further configured to recognize an image shift dependent on the positional deviation and to correct coordinates of features of the captured image of the vehicle surround.

5. The system arrangement according to claim 1, further comprising a reproduction unit which outputs the corrected captured image of the vehicle surround.

6. The system arrangement according to claim 1, wherein the position sensor is configured to recognize the positional deviation dependent on an alignment angle of the rearview mirror apparatus.

7. The system arrangement according to claim 1, wherein the preset position corresponds to at least one of a factory setting or a calibrated position.

8. The system arrangement according to claim 1, wherein the data interface is at least one of a wired interface or an air interface.

9. A method for reliable and error-tolerant evaluation of a visually captured vehicle surround, the method comprising:
   measuring a positional deviation of a rearview mirror apparatus comprising at least one position sensor from a preset position;
   capturing an image of the vehicle surround by an imaging sensor integrated in the rearview mirror apparatus;
   transmitting the positional deviation and the captured image of the vehicle surround to a control unit; and
   correcting the captured image of the vehicle surround by the control unit dependent on the positional deviation.

10. A computer program product comprising a non-transitory computer readable medium having stored thereon program code which, when executed on a processor, carries out a method of:
    measuring a positional deviation of a rearview mirror apparatus comprising at least one position sensor from a preset position;
    capturing an image of the vehicle surround by an imaging sensor integrated in the rearview mirror apparatus;
    transmitting the positional deviation and the captured image of the vehicle surround to a control unit; and
    correcting the captured image of the vehicle surround by the control unit dependent on the positional deviation.

* * * * *